United States Patent
Osako et al.

(10) Patent No.: US 9,638,058 B2
(45) Date of Patent: May 2, 2017

(54) SCROLL PORTION STRUCTURE FOR RADIAL TURBINE OR DIAGONAL FLOW TURBINE

(75) Inventors: Katsuyuki Osako, Tokyo (JP); Daigo Watanabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 958 days.

(21) Appl. No.: 13/808,499

(22) PCT Filed: Dec. 8, 2011

(86) PCT No.: PCT/JP2011/078420
§ 371 (c)(1),
(2), (4) Date: Jan. 28, 2013

(87) PCT Pub. No.: WO2012/086423
PCT Pub. Date: Jun. 28, 2012

(65) Prior Publication Data
US 2013/0287560 A1   Oct. 31, 2013

(30) Foreign Application Priority Data

Dec. 20, 2010   (JP) ................................. 2010-282825

(51) Int. Cl.
*F01D 25/14*   (2006.01)
*F01D 9/02*   (2006.01)
(Continued)

(52) U.S. Cl.
CPC ............. *F01D 25/14* (2013.01); *F01D 9/026* (2013.01); *F02B 39/00* (2013.01); *F02B 39/005* (2013.01); *F02C 6/12* (2013.01); *F05D 2220/40* (2013.01)

(58) Field of Classification Search
CPC .......... F01D 9/026; F01D 25/14; F01D 25/24; F02B 37/00; F02B 37/025; F02B 39/00;
(Continued)

(56) References Cited

U.S. PATENT DOCUMENTS 2,944,786 A * 7/1960 Angell ...................... F01D 1/08
                                                     415/147
4,381,171 A * 4/1983 Chapple ................ F01D 17/143
                                                     415/157
(Continued)

FOREIGN PATENT DOCUMENTS

CN   1412417 A   4/2003
JP   62-118029 A   5/1987
(Continued)

OTHER PUBLICATIONS

International Preliminary Report on Patentability mailed Jul. 11, 2013 issued in PCT/JP2011/078420 and an English translation.
(Continued)

*Primary Examiner* — Gregory Anderson
*Assistant Examiner* — Alexander White
(74) *Attorney, Agent, or Firm* — Birch, Stewart, Kolasch & Birch, LLP

(57) ABSTRACT

In a scroll structure for a radial turbine configured such that a turbine rotor 02 is rotationally driven by causing exhaust gas to flow from a spiral scroll portion 4 formed in a turbine housing 1 toward a rotor blade 3 of the scroll portion 4 in a radial direction, and act on the rotor blade 3, then flow out in an axial direction, a heat radiation space portion is formed in a shroud portion 11 between the turbine housing 1 and a turbine chamber provided with the rotor blade 3.

3 Claims, 3 Drawing Sheets

(51) Int. Cl.
*F02B 39/00* (2006.01)
*F02C 6/12* (2006.01)

(58) Field of Classification Search
CPC ...... F02B 39/005; F04D 25/04; F04D 25/045; F04D 29/422; F04D 29/428; F02C 6/12; F05D 2220/40; F05B 2220/40
USPC ....... 415/71, 203, 204, 205, 212.1; 416/176, 416/177, 180, 182
See application file for complete search history.

(56) References Cited

U.S. PATENT DOCUMENTS

| | | | |
|---|---|---|---|
| 4,389,845 A | 6/1983 | Koike | |
| 2003/0077170 A1 | 4/2003 | Osako et al. | |

FOREIGN PATENT DOCUMENTS

| | | |
|---|---|---|
| JP | 5-44488 A | 2/1993 |
| JP | 8-284602 A | 10/1996 |
| JP | 10-331652 A | 12/1998 |
| JP | 2000-257436 A | 9/2000 |
| JP | 2003-120303 A | 4/2003 |
| JP | 2006-161574 A | 6/2006 |
| JP | 2008-82211 A | 4/2008 |
| JP | 4485334 B2 | 4/2010 |

OTHER PUBLICATIONS

Japanese Office Action issued Aug. 15, 2014 in the corresponding Japanese Application No. 2010-282825 with an English translation.
Decision to Grant a Patent effective Nov. 4, 2014 issued in corresponding Japanese Application No. 2010-282825 with an English translation.
Chinese Notice of Allowance for Chinese Application No. 201180037830.6, dated Jul. 27, 2015, with an English translation.
Chinese Office Action dated Jun. 27, 2014 issued in corresponding Chinese Application No. 201180037830.6 with English translation.

\* cited by examiner

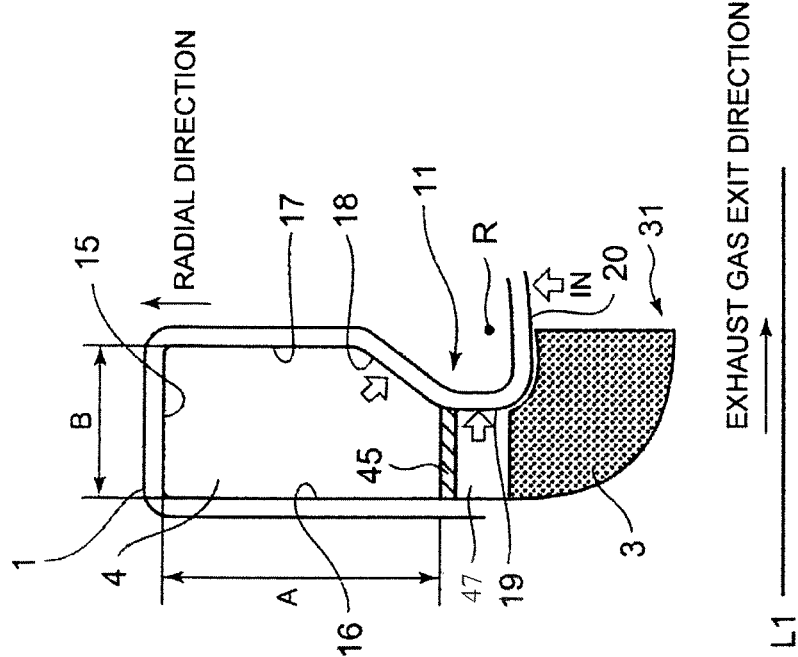
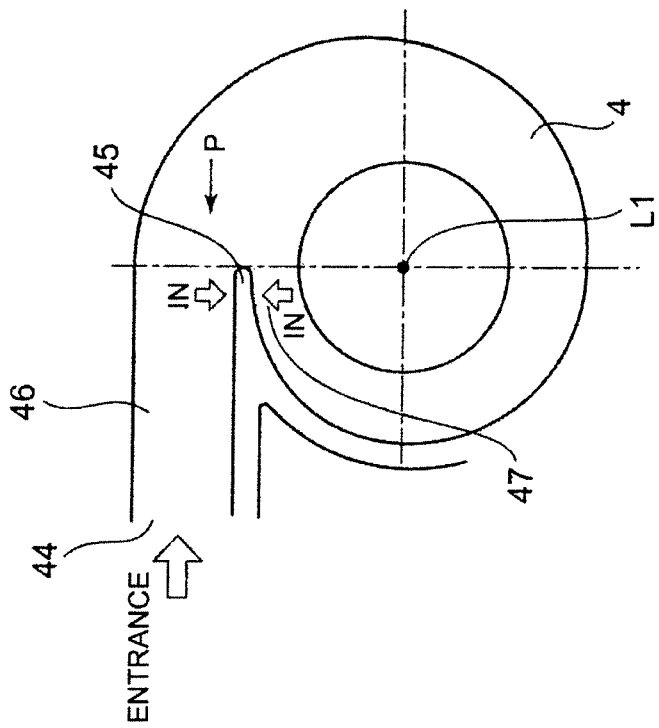

TURBINE SCROLL (CONVENTIONAL STRUCTURE)

SCROLL PORTION STRUCTURE FOR RADIAL TURBINE OR DIAGONAL FLOW TURBINE

TECHNICAL FIELD

The present invention relates to a scroll portion structure forming an exhaust gas flow path of a radial turbine or a diagonal flow turbine which is used in a turbo charger (exhaust turbo charger) of an internal combustion engine and is configured such that a turbine rotor is rotationally driven by causing exhaust gas to flow toward a rotor blade of the turbine rotor from a spiral scroll portion in a radial direction and act on the rotor blade, then flow out in an axial direction.

BACKGROUND ART

In a turbo charger (exhaust turbo charger) used in an internal combustion engine of an automobile or the like, there is often used a radial turbine or a diagonal flow turbine configured such that a turbine rotor is rotationally driven by causing exhaust gas to flow from a spiral scroll portion formed in a turbine housing toward a rotor blade of the turbine rotor positioned inside the scroll portion in a radial direction, act on the rotor blade, and then flow out in an axial direction.

FIG. 4 illustrates Japanese Patent Application Laid-open No. 2003-120303 (Patent Document 1) showing an example of the turbo charger using the above radial turbine as a conventional art. In the drawing, 01 denotes a turbine housing, 04 denotes a spiral scroll portion formed in the turbine housing 01, 05 denotes an exhaust gas outlet passage formed in the inner periphery of the turbine housing 01, 06 denotes a compressor housing, and 09 denotes a bearing housing which connects the turbine housing 01 and the compressor housing 06.

010 denotes a turbine wheel, and a plurality of rotor blades 03 are fixed to the outer periphery of the turbine wheel at regular intervals in a circumferential direction. 07 denotes a compressor impeller, 08 denotes a diffuser provided at an air exit of the compressor impeller 07, and 012 denotes a rotor shaft which connects the turbine wheel 010 and the compressor impeller 07. 011 denotes a pair of bearings which are attached to the bearing housing 09 to support the rotor shaft 12.

L1 denotes an axial center of rotation of the turbine wheel 010, the compressor impeller, and the rotor shaft 012.

In the turbo charger with the radial turbine, exhaust gas from an internal combustion engine (not shown) enters into the scroll portion 04, flows into the rotor blade 03 from an entrance end surface on the outer peripheral side of the rotor blade 03 while spinning along the spiral shape of the scroll portion 04, flows toward the center of the turbine rotor 02 in a radial direction, performs expansion work on the turbine rotor 02, flows out in the direction of the axis L1 of the rotor shaft 012, and is sent to the outside of the turbo charger from the exhaust gas outlet passage 05.

FIG. 5(A) shows the vicinity of a tongue portion formed in the inner periphery of an exhaust gas entrance of the radial turbine of Patent Document 1, and is a schematic cross-sectional structural view in a direction orthogonal to the axis L1 of the rotor shaft 012, while FIG. 5(B) is a view obtained when viewed in a direction indicated by an arrow W of FIG. 5(A).

In FIG. 5(A), 04 denotes the scroll portion, 044 denotes an exhaust gas inlet, and 045 denotes a tongue portion. A structure is adopted in which the tongue portion 045 separates a flow path 046 as a connection portion, through which the exhaust gas from the exhaust gas inlet 044 passes to be guided to the scroll portion 04, from a rotor blade side passage 047 through which the exhaust gas flows into the rotor blade 03.

As shown in FIG. 5(B), the tongue portion 045 receives exhaust gas heat from the side of the flow path 046 and the side of the rotor blade side passage 047, while a heat radiation path of the tongue portion 045 for the heat accumulated in the tongue portion 045 is narrow as indicated by an arrow Z (see FIG. 5(A)), and heat radiation efficiency of the tongue portion 045 is poor.

In addition, the cross-sectional shape of the scroll portion 04 becomes wider in the direction of the axis L1 of the rotor shaft 012 and a shroud portion X is deep so that the exhaust gas heat tends to stay and the heat radiation efficiency at the corresponding portion is poor.

Consequently, the temperature of the tongue portion 045 sometimes reaches 800 to 900° C.

Patent Document 1: Japanese Patent Application Laid-open No. 2003-120303

DISCLOSURE OF THE INVENTION

In the radial turbine described above, high-temperature exhaust gas from the engine passes through the flow path 046 and flows out to the rotor blade side passage 047 while spinning along the spiral portion of the scroll portion 04.

As a result, the tongue portion 045 is exposed to the high-temperature exhaust gas from both of the side of the flow path 046 and the side of the rotor blade side passage 047 and, since the heat radiation path of the tongue portion 045 is present only in the Z direction (see FIG. 5(A)), heat tends to be accumulated and the temperature is increased.

Consequently, in the tongue portion 045, surface oxidation or fatigue damage resulting from thermal stress occurs. As a countermeasure, an expensive material having excellent high temperature oxidation resistance and fatigue resistance (e.g., austenitic cast steel, ferritic cast steel, or the like) is used as the material for the turbine housing 01, which is a factor for an increase in cost.

The present invention has been achieved in order to solve the above problem, and an object thereof is to downgrade the heat resistance of the material used for the turbine housing to achieve a reduction in cost by increasing the outside air exposed surface area of the exterior of each of the connection portion (tongue portion) of the turbine housing 01 and the shroud portion X of the turbine housing 01 in which the tongue portion 045 is disposed to thereby increase heat radiation from the corresponding portions and reduce heat accumulated in the tongue portion 045.

In order to solve the above problem, in a scroll structure for a radial turbine or a diagonal flow turbine configured such that a turbine rotor is rotationally driven by causing exhaust gas to flow from a spiral scroll portion formed in a turbine housing toward a rotor blade of the scroll portion in a radial direction and act on the rotor blade, then flow out in an axial direction, a concave portion as a heat radiation space is formed in a shroud portion formed between the scroll portion and a turbine chamber wall covering the rotor blade in a radial cross section of the radial turbine or the diagonal flow turbine, and the concave portion is formed in a circumferential direction.

With the above configuration, it becomes possible to downgrade high temperature oxidation resistance and thermal fatigue resistance of a material used for the turbine housing to achieve a reduction in cost by providing the heat radiation space in the shroud portion between the scroll portion and the turbine chamber.

In addition, in the present invention, a radial cross-sectional shape of the scroll portion in which the exhaust gas flows in a direction orthogonal to a line joining a tongue portion separating a flow path, which leads to the scroll portion, from a rotor blade side flow path, which leads to the rotor blade, to an axis of the scroll portion is preferably formed of an oblong rectangular cross-sectional shape in which a length in a radial direction is longer than a length in an axial direction.

With the above configuration, the axial length of an exhaust gas flow cross section of the scroll portion is reduced, and hence the depth of a concave portion formed between the turbine chamber wall and the scroll portion is reduced, the size of an opening of the concave portion can be increased, it becomes easier to make the thickness on the housing side equal to that of the surrounding area during the formation of the turbine housing, solidification rejection during the formation is suppressed, and product accuracy is thereby stabilized.

Further, in the present invention, the radial cross-sectional shape of the scroll portion is preferably configured such that a scroll width ratio A/B between a width A in the radial direction and a width B in an axial direction of the axis satisfies $1<A/B\leq2$.

With the above configuration, by reducing the width in the axial direction by increasing the scroll width ratio ($1<A/B$), the amount of projection of the housing in an exhaust gas flow-out direction is reduced, the thickness of the housing at the corresponding portion (the shroud portion) is reduced, the concave portion as the heat radiation space portion is formed to be large in size, and an improvement in the heat radiation effect of the shroud portion is thereby achieved.

In addition, by having the scroll width ratio of $A/B\leq2$, it is possible to prevent the deterioration of mountability on an engine caused by an increase in the outer diameter of the scroll portion.

Further, in a case where the cross-sectional area is not changed, when the width B is reduced, the surface area of the flow path is increased so that the flow resistance of the exhaust gas is increased, the performance of the turbo charger is degraded, and the weight is increased. However, it becomes possible to solve these problems with the above scroll width ratio.

Furthermore, in the present invention, an inclined portion in an exhaust gas flow direction of a tongue portion which separates a flow path leading to the scroll portion from a rotor blade side flow path leading to the rotor blade is preferably formed into a shape along a logarithmic spiral.

With the above configuration, the exhaust gas flown into the scroll portion is guided along the outer periphery of the scroll portion, and hence, by forming the inclined portion in the flow direction of the tongue portion into the shape of the logarithmic spiral, a flow-out angle from the tongue portion and an exhaust gas flow-out angle to the rotor blade 3 match with each other so that it is possible to facilitate the exhaust gas flow in the scroll portion to fully deliver the performance of the turbo charger.

In addition, the intersection angle of the scroll portion of the tongue portion and the flow path leading to the scroll portion is increased, and hence, by providing a cooling space at the corresponding portion, it is possible to suppress an increase in the temperature of the tongue portion.

It is made possible to downgrade high temperature oxidation resistance and thermal fatigue resistance of the material used for the turbine housing to achieve a reduction in cost by configuring the cross-sectional shape of the scroll portion such that the scroll width ratio α between the width A in the radial direction and the width B in the axial direction of the axis satisfies $1<A/B\leq2$ to thereby increase the size of the concave portion in the shroud portion, promote convection of outside air, and facilitate heat radiation in not only the tongue portion but also the entire circumference of the shroud.

In addition, it is made possible to promote the convection of outside air to facilitate the heat radiation in the tongue portion by forming the tongue portion wall shape in the exhaust gas flow direction into the shape of the logarithmic spiral and providing the cooling space (corresponds to 79 of FIG. 2) at the corresponding portion.

BRIEF DESCRIPTION OF THE DRAWINGS

FIG. 1(A) is a cross-sectional view in a direction orthogonal to the axis of a turbine rotor of a tongue portion according to a first embodiment of the present invention.

FIG. 1(B) is a view obtained when viewed in a direction indicated by an arrow P of FIG. 1(A) and is a schematic structural view of a principal portion showing an upper-half section along the rotational axis of each of a scroll portion and the turbine rotor;

BEST MODE FOR CARRYING OUT THE INVENTION

Figure 2:
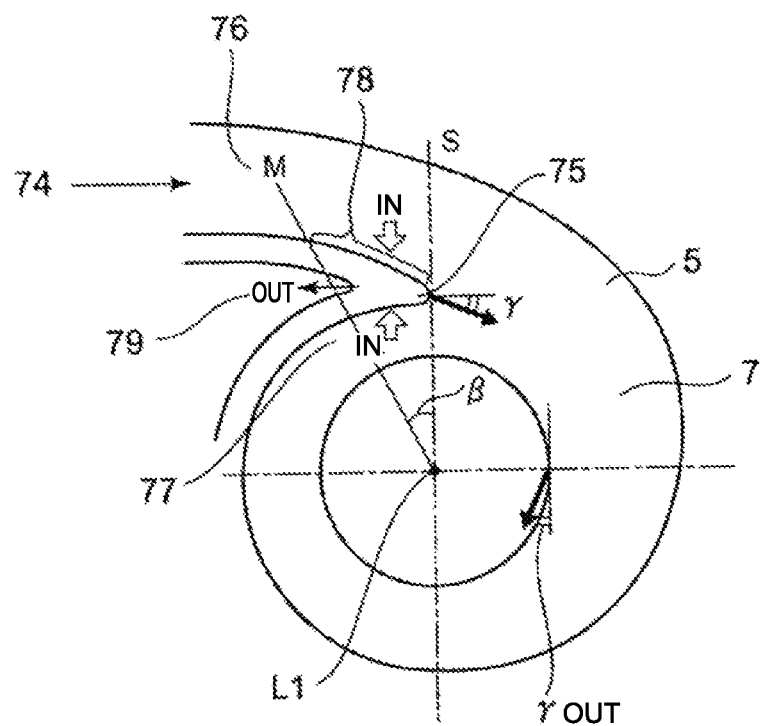
FIG. 2 is a cross-sectional view in a direction orthogonal to the axis of a turbine rotor of a tongue portion according to a second embodiment of the present invention.

A detailed description is given hereinbelow of the present invention by using embodiments shown in the drawings.

Note that the scope of the present invention is not limited only to dimensions, materials, shapes, and relative arrangements of constituent parts described in the embodiments unless specifically described, and they are merely illustrative examples.

First Embodiment

On the basis of FIG. 1, the schematic structural view of an exhaust gas flow space portion of a scroll portion according to a first embodiment of the present invention is shown.

A description is given of a turbine scroll portion according to the first embodiment of the present invention.

FIG. 1(A) is a cross-sectional view in a direction orthogonal to the axis of a turbine rotor of a tongue portion according to the first embodiment of the present invention, while FIG. 1(B) is a view obtained when viewed in a direction indicated by an arrow P of FIG. 1(A) and is a schematic structural view of a principal portion showing an upper-half section along the rotational axis of each of the scroll portion and the turbine rotor.

Figure 4:
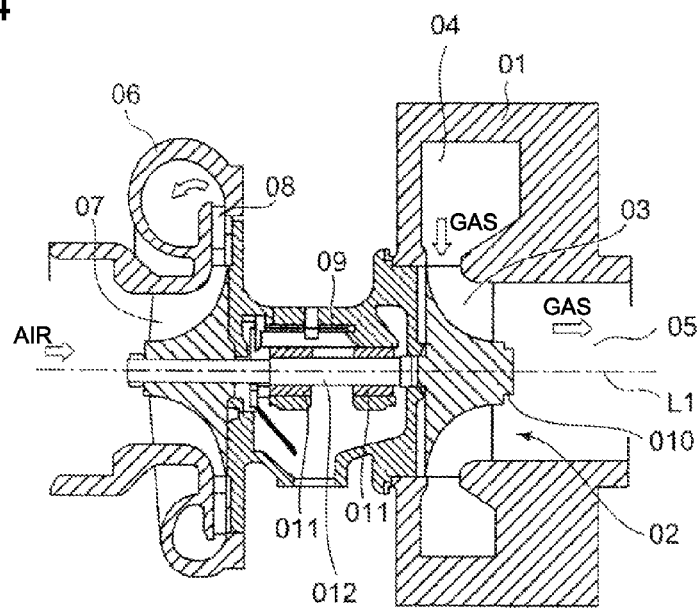
FIG. 4 is a cross-sectional view along the rotational axis of a turbo charger using a radial turbine to which the present invention is applied.
Figure 5A:
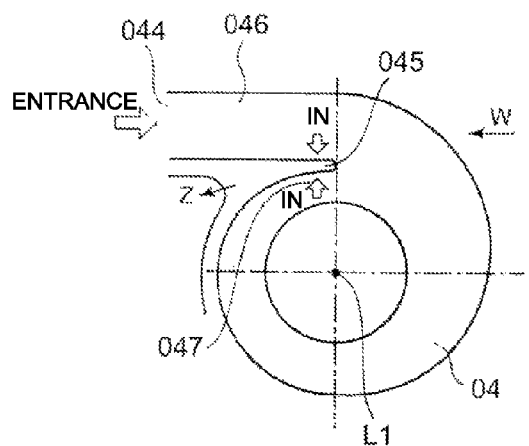
FIG. 5(A) is a cross-sectional view in a direction orthogonal to the axis of a turbine rotor of a tongue portion in a conventional art.
Figure 5B:
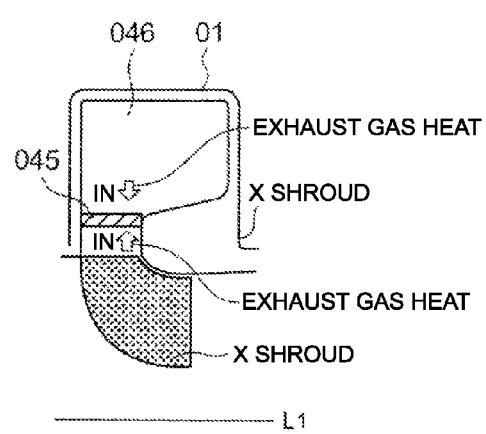
FIG. 5(B) is a view obtained when viewed in a direction indicated by an arrow W of FIG. 5(A).

In FIG. 4 showing the entire structure of a turbo charger using a radial turbine to which the present invention is applied, 01 denotes a turbine housing, 04 denotes a spiral scroll portion formed in the turbine housing 01, 05 denotes an exhaust gas outlet passage formed in the inner periphery of the turbine housing 01, 06 denotes a compressor housing, and 09 denotes a bearing housing which connects the turbine housing 01 and the compressor housing 06.

010 denotes a turbine wheel, and a plurality of rotor blades 03 are fixed to the outer periphery of the turbine wheel 010 at regular intervals in a circumferential direction. 07 denotes a compressor impeller, 08 denotes a diffuser provided at an air exit of the compressor impeller 07, and 012 denotes a rotor shaft which connects the turbine wheel 010 and the compressor impeller 07. 011 denotes a pair of bearings which are attached to the bearing housing 09 to support the rotor shaft 12.

L1 denotes an axial center of rotation of the turbine wheel 010, the compressor impeller, and the rotor shaft 012.

In the above turbo charger with the radial turbine described above, exhaust gas from an internal combustion engine (not shown) enters into the scroll portion 4 from an exhaust gas inlet, flows into the rotor blade 03 from an entrance end surface on the outer peripheral side of the plurality of rotor blades 03 while spinning along the spiral of the scroll portion 04, flows toward the center of the turbine wheel 010 in a radial direction, performs expansion work on the turbine wheel 010, and then flows in an axial direction to be discharged from the exhaust gas outlet passage 05.

As described above, the basic structure of the turbo charger with the radial turbine is the same as that of the conventional art.

In the present invention, the shape of the scroll is improved.

In FIG. 1(A), 46 denotes a flow path formed of a turbine housing 1 which causes the exhaust gas from the exhaust gas inlet to flow into a scroll portion 4. 4 denotes the scroll portion formed of the turbine housing 1 which is formed into a spiral shape, converts the exhaust gas flown in from the flow path 46 into a spiral flow, and causes the exhaust gas to flow into rotor blade 3 via a rotor blade side passage 47. 45 denotes a tongue portion which is a connection portion between the flow path 46 and the scroll portion 4 and separates the flow path 46 from the rotor blade side passage 47.

The scroll portion 4 includes an outer peripheral wall 15, a front wall 16 (for the convenience of description, the exhaust gas discharge direction is assumed to be "rear"), a rear wall 17, and an inner peripheral wall 18.

The scroll portion 4 is formed such that the distance between the front wall 16 and the rear wall 17, i.e., a width B in the direction of the axis L1 is smaller than the distance between the outer peripheral wall 15 and the inner peripheral wall 18, i.e., a width A in a radial direction.

The shape of the scroll portion 4 is preferably formed such that a width ratio α between the width A in the radial direction and the width in the direction of the axis L1 satisfies 1<A/B≤1.2 to 2.0.

When the length of the outer peripheral wall 15 of the scroll portion 4 is made smaller than the length in the radial direction in a state where the flow area of the scroll portion 4 is maintained, the diameter of the outer peripheral wall 15 is increased and the rear wall 17 is moved closer to the front wall 16.

In addition, when the width ratio is set to a value larger than 2 (in a case where the cross-sectional area is not changed, the width B is reduced), the surface area of the flow path is increased so that the flow resistance of the exhaust gas is increased, the performance of the turbo charger is degraded, and the weight thereof is increased.

Further, when the length in the radial direction is increased, the entire size of the turbo charger is increased and mountability on the engine is deteriorated.

Furthermore, the axial length of the exhaust gas flow cross section of the scroll portion is reduced, and hence the depth of a concave portion formed between a turbine chamber wall and the scroll portion is reduced so that it is possible to increase the size of an opening of the concave portion and it becomes easier to make the thickness on the housing side equal to that of the surrounding area. As a result, solidification rejection during formation (in a case where the thickness is significantly uneven, a portion having a small thickness is solidified early. However, in the case of a portion having a large thickness, the solidification of the central portion thereof is slow, and a shallow concave portion tends to be formed in the surface portion thereof due to the solidification of the central portion. Deformation is caused in some cases.) is prevented and product accuracy is stabilized.

With the above arrangement, it is possible to increase the size of an opening R of a shroud portion 11 formed of the inner peripheral wall 18 of the tongue portion 45, a rotor blade side rear wall 19, and a turbine chamber wall 20 of the turbine housing 1, and the occurrence of the flow of outside air that comes in contact with the opening R is facilitated so that it is possible to radiate heat accumulated not only in the tongue portion 45 but also in the entire circumference of the shroud through the opening R.

By suppressing the accumulation of the heat in the tongue portion and the entire circumference of the shroud, it is possible to downgrade the heat resistance of the material used for the turbine housing 5 to achieve a reduction in cost.

Second Embodiment

In the present embodiment, the description of the same components as those in the first embodiment is omitted by retaining the same reference numerals.

Figure 3:
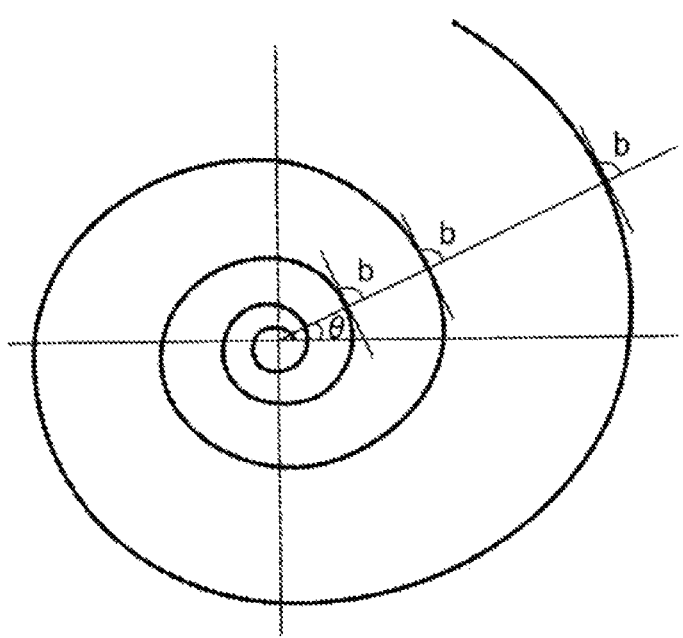
FIG. 3 is an explanatory view of a tongue-shaped logarithmic spiral according to the second embodiment of the present invention.

On the basis of FIG. 3, a turbine scroll portion according to a second embodiment of the present invention is described.

FIG. 2 is a cross-sectional view in a direction orthogonal to the axis of a turbine rotor of a tongue portion according to the second embodiment of the present invention.

76 denotes a flow path formed of a turbine housing 5 which causes the exhaust gas from an exhaust gas inlet 74 to flow into the scroll portion 4. 75 denotes a connection portion between the flow path 76 and the scroll portion 7, and is a tongue portion which separates a rotor blade side passage 77.

In the tongue portion 75, an inclined portion in an exhaust gas flow direction leading to the scroll portion 7 is formed into a shape along a logarithmic spiral.

The range of the shape along the logarithmic spiral is from a line S which joins the axis L1 and the tip of the tongue portion to a portion where a line M obtained by inclining the line S toward the exhaust gas inlet 74 by an angle of β about the axis L1 intersects the surface of the tongue portion 75, and the portion in the range is set as a logarithmic spiral portion 78.

Although β is set to about 30 degrees in the present embodiment, the range of the logarithmic spiral portion 78 may be any range as long as an exhaust gas flow-out angle of the exhaust gas flowing toward the scroll portion 7 from the tongue portion is along the logarithmic spiral, and β may be increased or decreased depending on the situation.

The logarithmic spiral is one of spirals often seen in the natural world and is also called an equiangular spiral. As the nature of the logarithmic spiral, as shown in FIG. 3, an angle b formed between a line drawn from the rotation center at an angle θ and a tangent at an intersection point of the line and the spiral is always constant.

By having the above structure, a flow-out angle γ from the tongue portion 75 and an exhaust gas flow-out angle γ to the rotor blade 3 match with each other so that it is possible to facilitate the exhaust gas flow in the scroll portion to fully deliver the performance of the turbo charger.

The intersection angle of the flow path of the tongue portion and the scroll portion is increased, a cooling space 79 can be provided at the corresponding portion, and a part of the tongue portion 75 is exposed to outside air so that it is possible to effectively suppress an increase in the temperature of the tongue portion.

INDUSTRIAL APPLICABILITY

The present invention is suitably used in a radial turbine which is used in an internal combustion engine or the like in order to improve the output of the internal combustion engine, and is configured such that a turbine rotor is rotationally driven by causing exhaust gas to flow in from a spiral scroll portion in a radial direction, act on a rotor blade, and then flow out in an axial direction.

The invention claimed is:

1. A scroll structure for a radial turbine or a diagonal flow turbine configured such that a turbine rotor is rotationally driven by causing exhaust gas to flow from a spiral scroll portion formed in a turbine housing toward a rotor blade of the scroll portion in a radial direction, act on the rotor blade, and then flow out in an axial direction, comprising a shroud portion formed between
the scroll portion and a turbine chamber wall covering the rotor blade in a radial cross section of the radial turbine, and a concave space formed as a heat radiation portion over the entire circumference of the shroud, wherein
a radial cross-sectional shape of the scroll portion in which the exhaust gas flows in a direction orthogonal to a line joining a tongue portion separating a flow path, which leads to the scroll portion, from a rotor blade side flow path, which leads to the rotor blade, to an axis of the scroll portion is defined by:
an outer peripheral wall;
a front wall which has one end portion connecting with one end portion of the outer peripheral wall;
a rear wall which has one end portion connecting with another end portion of the outer peripheral wall;
an inner peripheral wall which has one end portion connecting with another end portion of the rear wall, the inner peripheral wall extending inwardly and obliquely from the other end portion of the rear wall toward the front wall in the radial direction; and
the tongue portion which extends from another end portion of the inner peripheral wall to the front wall, and
a dimension B in the axial direction between the front wall and the rear wall is smaller than a dimension A in the radial direction between the outer peripheral wall and the tongue portion.

2. The scroll structure for a radial turbine or a diagonal turbine according to claim 1,
wherein the radial cross-sectional shape of the scroll portion is configured such that a scroll width ratio A/B between the dimension A in the radial direction and the dimension B in an axial direction of the turbine axis satisfies 1<A/B≤2.

3. The scroll structure for a radial turbine or a diagonal flow turbine according to claim 1, wherein an inclined portion in an exhaust gas flow direction of the tongue portion is formed into a shape along a logarithmic spiral.

* * * * *